United States Patent
Kroening

(10) Patent No.: US 9,786,971 B2
(45) Date of Patent: Oct. 10, 2017

(54) SYSTEMS AND METHODS FOR FERRITE REDUNDANCY SWITCH NETWORKS

(71) Applicant: Honeywell International Inc., Morristown, NJ (US)

(72) Inventor: Adam M. Kroening, Atlanta, GA (US)

(73) Assignee: Honeywell International Inc., Morris Plains, NJ (US)

( * ) Notice: Subject to any disclaimer, the term of this patent is extended or adjusted under 35 U.S.C. 154(b) by 212 days.

(21) Appl. No.: 14/537,650

(22) Filed: Nov. 10, 2014

(65) Prior Publication Data

US 2016/0013530 A1 Jan. 14, 2016

Related U.S. Application Data

(60) Provisional application No. 62/022,275, filed on Jul. 9, 2014.

(51) Int. Cl.
| | | |
|---|---|---|
| H01P 1/39 | (2006.01) | |
| H01P 1/11 | (2006.01) | |
| H01P 1/38 | (2006.01) | |
| H01P 3/06 | (2006.01) | |
| H01P 3/08 | (2006.01) | |

(52) U.S. Cl.
CPC ............... H01P 1/11 (2013.01); H01P 1/38 (2013.01); H01P 1/39 (2013.01); H01P 3/06 (2013.01); H01P 3/08 (2013.01)

(58) Field of Classification Search
CPC .................................... H01P 1/39; H01P 1/38
USPC .................................................. 333/1.1, 24.2
See application file for complete search history.

(56) References Cited

U.S. PATENT DOCUMENTS

| | | | |
|---|---|---|---|
| 3,931,623 | A | 1/1976 | Sones et al. |
| 4,061,989 | A | 12/1977 | Petrelis |
| 4,109,202 | A | 8/1978 | Kudsia et al. |
| 4,644,301 | A | 2/1987 | Hecht |
| 4,688,259 | A | 8/1987 | Edridge |
| 6,885,257 | B2 | 4/2005 | Kroening |

(Continued)

FOREIGN PATENT DOCUMENTS

| | | |
|---|---|---|
| DE | 4203174 | 8/1993 |
| EP | 2806567 | 11/2014 |

OTHER PUBLICATIONS

Burrows, "Technical Report 639: Design of Microwave Beam-Switching Networks", Dec. 1983, pp. 1-83, Publisher: Lincoln Laboratory, Massachusetts Institute of Technology.

(Continued)

*Primary Examiner* — Stephen E Jones
(74) *Attorney, Agent, or Firm* — Fogg & Powers LLC

(57) ABSTRACT

Systems and methods for ferrite redundancy switch networks are disclosed. In one embodiment, a redundant ferrite switch system comprises: a first plurality of circulator modules, a second plurality of circulator modules, and a plurality of components coupled to the first plurality of circulator modules and coupled to the second plurality of circulator modules, wherein the first plurality of circulator modules and the second plurality of circulator modules is able to route a path through the redundant ferrite switch system when more than two components in the plurality of components have failed. The first plurality of circulator modules and the second plurality of circulator modules each comprise, respectively: a plurality of inputs; a plurality of outputs; and a plurality of circulators connecting the plurality of inputs to the plurality of outputs.

16 Claims, 11 Drawing Sheets

(56) References Cited

U.S. PATENT DOCUMENTS

| | | |
|---|---|---|
| 7,049,900 B2 | 5/2006 | Kroening |
| 9,166,267 B2 | 10/2015 | Kroening et al. |
| 2003/0107447 A1 | 6/2003 | Kroening |
| 2011/0248796 A1 | 10/2011 | Pozgay |
| 2014/0320227 A1 | 10/2014 | Kroening et al. |
| 2015/0115737 A1 | 4/2015 | Forney |
| 2016/0013530 A1 | 1/2016 | Kroening |

OTHER PUBLICATIONS

Liang et al., "Integrated Redundancy Ring Based on Modular Approach", "26th International Communications Satellite Systems Conference (ICSSC)", Jun. 10-12, 2008, pp. 1-7, Publisher: American Institute of Aeronautics and Astronautics, Published in: San Diego, CA.

Kroening, "(M+1)-For-M Ferrite Redundancy Switch and Switch System", "U.S. Appl. No. 14/693,599, filed Apr. 22, 2015", , pp. 1-42, Published in: US.

European Patent Office, "Office Action from EP Application No. 14164656.2 mailed Nov. 4, 2014", "from Foreign Counterpart of U.S. Appl. No. 13/923,497", Nov. 4, 2014, pp. 1-5, Published in: EP.

European Patent Office, "European Search Report from EP Application No. 14164656.2 mailed Oct. 24, 2014", "from Foreign Counterpart of U.S. Appl. No. 13/923,497", Oct. 24, 2014, pp. 1/3, Published in: EP.

U.S. Patent and Trademark Office, "Office Action", "U.S. Appl. No. 13/923,497", Mar. 5, 2015, pp. 1-18.

European Patent Office, "Extended European Search Report from EP Application No. 15172148.7 mailed Nov. 25, 2015", "from Foreign Counerpart of U.S. Appl. No. 14/537,650", Nov. 25, 2015, pp. 1-11, Published in: EP.

Kroening, "Advances in Ferrite Redundancy Switching for Ka-band Low Noise Amplifiers", Mar. 2, 2015, pp. 1-7, Publisher: IEEE, Published in: US.

European Patent Office, "Communication pursuant to Article 94(3) EPC from EP Application No. 15172148.7 mailed Aug. 9, 2016", "from Foreign Counterpart of U.S. Appl. No. 14/537,650", Aug. 9, 2016, pp. 1-9, Published in: EP.

European Patent Office, "Extended European Search Report for EP Application No. 16197406.8", "Foreign counterpart to U.S. Appl. No. 14/948,116", Mar. 17, 2017, pp. 1-8, Published in: EP.

European Patent Office, "Invitation Pursuant to Article 94(3) and Rule 71(1) EPC", "Foreign Counterpart to U.S. Appl. No. 14/537,650", Mar. 13, 2017, pp. 1-6, Published in: EP.

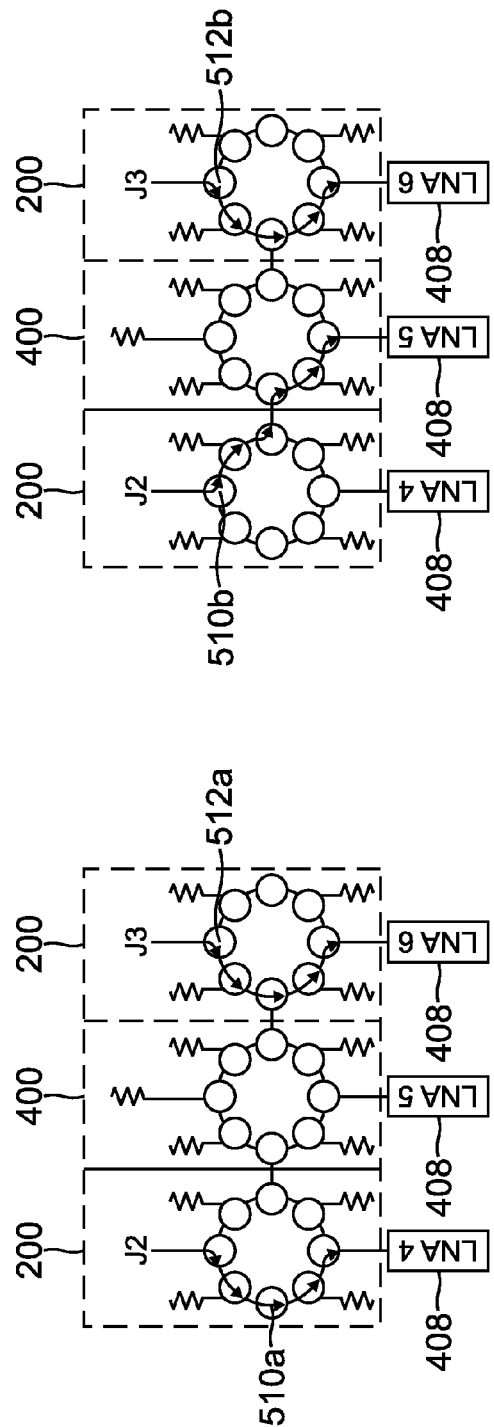
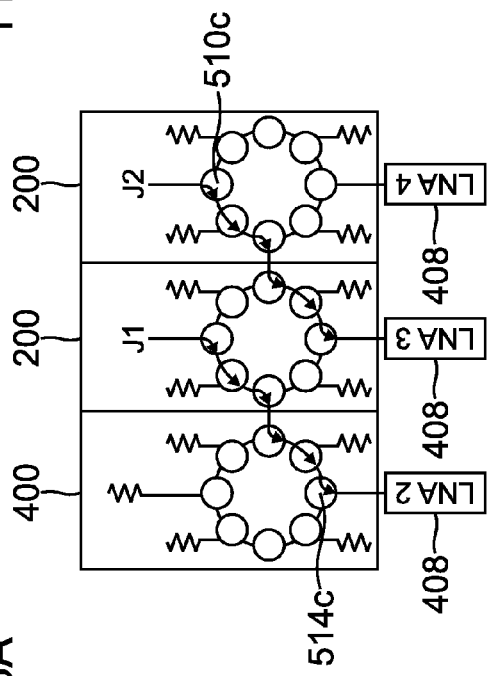
FIG. 5A
FIG. 5B
FIG. 5C ously designed switch networks that implement ferrite
SYSTEMS AND METHODS FOR FERRITE REDUNDANCY SWITCH NETWORKS

CROSS-REFERENCE TO RELATED APPLICATIONS

This application claims the benefit of U.S. Provisional Application Ser. No. 62/022,275, filed on Jul. 9, 2014, which is hereby incorporated herein by reference.

BACKGROUND

In certain communication networks, certain communication nodes in the network are not easily accessible for repairs in the event that equipment on the communication node experiences a failure. For example, communication nodes located in space are practically inaccessible and, as such, that failed equipment cannot be repaired. To prevent the failures from affecting the operation of the communication node, the communication equipment on the communication node includes standby equipment that increases the redundancy of any communication paths through the communication equipment. To control which communication paths are used through the communication equipment, a switch network is used to switch a communication path from failed equipment to standby equipment.

In at least one example, low noise amplifiers are prone to failures. Thus, a communication node will include a number of spare amplifiers. For example, at any given time, the communication node may use at most M amplifiers. The communication equipment may include N amplifiers such that when any of the M amplifiers experiences a failure, the switch network switches the communication path through one of the N amplifiers that is not currently active and switches the communication path away from the amplifier that failed. This redundant configuration of amplifiers and switch networks may be referred to as N for M redundancy.

In certain implementations, a switch network can be implemented using a network of switching ferrite circulators. One configuration of ferrite circulators that offers N for M redundancy for connecting N input ports to M output ports is known as order constrained networks. An order constrained network of circulators allows that any M of the N input ports can be connected to the M output ports. However, order constrained networks can be complex, such that switching networks have a different design for different combinations of N and M. Thus, the order constrained network generally fails to provide the opportunity to reuse previously designed switch networks that implement ferrite circulators.

Further, certain implementations of switch networks are subject to further constraints. For example, a system that includes low noise amplifiers and switch networks may provide sufficient redundancy to handle the failure of at least three low noise amplifiers. Also, a system may be constrained such that upon experiencing the first failure of a low noise amplifier, the system is able to switch a communication path from an input through the switch network without affecting other communication paths through the switch network.

SUMMARY

The embodiments of the present disclosure provide systems and methods for ferrite redundancy switch networks are disclosed.

In one embodiment, a redundant ferrite switch system comprises: a first plurality of circulator modules, wherein the first plurality of circulator modules comprises: a first plurality of first inputs; a first plurality of first outputs; and a first plurality of circulators configured to connect the first plurality of first inputs to the first plurality of first outputs. Furthermore, the redundant ferrite switch system comprises: a second plurality of circulator modules, wherein the second plurality of circulator modules comprises: a second plurality of second inputs; a second plurality of second outputs; and a second plurality of circulators configured to connect the second plurality of second inputs to the second plurality of second outputs; and a plurality of components coupled to the first plurality of circulator modules and coupled to the second plurality of circulator modules, wherein the first plurality of circulator modules and the second plurality of circulator modules is able to route a path through the redundant ferrite switch system when more than two components in the plurality of components have failed.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 5A-5C are schematic illustrations of the routing of signals through a switch network configuration in one embodiment described in the present disclosure;

Figure 1:
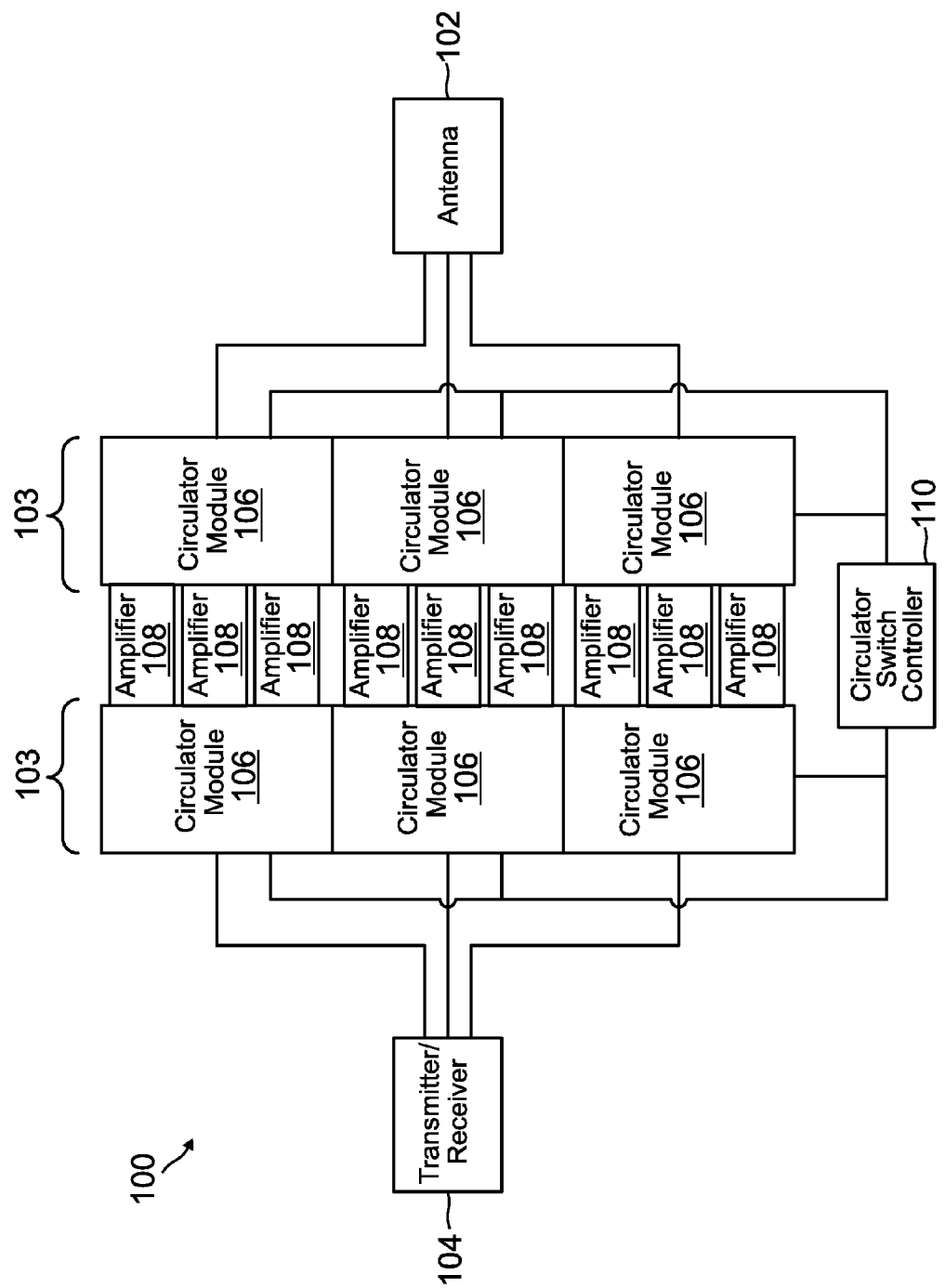
FIG. 1 is a block diagram of a switch network in one embodiment described in the present disclosure

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In the present disclosure, various implementations are described for providing switching networks comprised of circulators that provide sufficient redundancy to allow for the failure of at least three communication paths through the switching networks. Further, the implementations described herein further provide switching networks where the communication path of a channel can change without affecting the communication paths of other channels when the switching network first experiences a failure. In subsequent failures, the communication paths of the different channels may change to accommodate the rerouting of communication paths through the switching network. To meet the criteria, a base circulator module, that is able to provide redundancy that can withstand failures on up to two communication paths, is combined with other similar circulator modules. Then a combination of terminating loads and/or 2-for-1 redundant triad switches are coupled to the base circulator modules such that the arrangement of components in the switching network is able to operate such that the above described criteria is satisfied.

FIG. 1 is a block diagram of a portion of a system 100 that implements redundancy networks that are fabricated from circulator modules. In one implementation as shown, system 100 is part of a communication node that transmits and receives signals. For example, the system 100 receives a signal through an antenna 102. The signal is amplified by at least one amplifier 108 and then processed by a transmitter/receiver 104. In at least one implementation the amplifier 108 may be a low noise amplifier, a power amplifier, a travelling wave tube amplifier, or the like. Also, in certain implementations, the transmitter/receiver 104 provides a signal that is amplified by the amplifiers 108 and then provided to the antenna 102 for radiation to another communication node in the communication network. In certain embodiments, the system 100 is implemented on a platform that is inaccessible for repairs when a component on the system experiences a fault. For example, the system 100 may be implemented on a satellite located in space or other inaccessible location. In at least one embodiment, an amplifier 108 in the system 100 may experience a failure during the life of the system 100. To prevent the failure from negatively affecting the operation of the system 100, when the system 100 begins operation, the system 100 may include multiple amplifiers 108, where a portion of the amplifiers 108 function as standby amplifiers in the event that an operating amplifier fails. When an operating amplifier fails, a switching network 103 changes a communication path that diverts away from the failed LNA to pass through a standby LNA. As shown in FIG. 1, the amplifiers 108 are used as examples of electronic components, where the input/output ports of the components may connect to other components through transmission media that includes waveguides, microstrip, coaxial, and the like. In at least one implementation, the components may connect to other components via adapters that allow the component to interface with other components fabricated in a different transmission media. It is intended that the switching network 103, as described herein, can be used to change electrical paths through an operating component to a standby component.

In certain implementations, the switching network 103 is comprised of circulator modules 106. A circulator module 106 is a modular network of circulators that can be interconnected with one another to create the larger switching network 103. In at least one embodiment, a circulator module 106 contains multiple ferrite circulators that are connected to one another to provide switching capabilities between a number of module inputs and module outputs. In certain implementations, the ferrite circulators in a circulator module 106 may be waveguide circulators, where each circulator has three arms arranged at 120° that meet in a common junction. The common junction may be loaded with a non-reciprocal material such as ferrite. When a magnetizing field is created in the ferrite element that is located at the common junction, a gyromagnetic effect can be used to switch the microwave signal from one waveguide arm to another. By reversing the direction of the magnetizing field, the direction of switching between the waveguide arms is reversed. Thus, a switching circulator is functionally equivalent to a fixed-bias circulator but has a selectable direction of circulation. RF energy can be routed with low insertion loss from one waveguide arm to either of the two outputs arms. If one of the waveguide arms is terminated in a matched load, then the circulator acts as an isolator, with high loss in one direction of propagation and low loss in the other direction. Reversing the direction of the magnetizing field will reverse the direction of high and low isolation.

In certain embodiments, to control the direction of magnetization for the ferrite circulators in the different circulator modules 106, the system 100 includes a circulator switch controller 110. The circulator switch controller 110 sends electrical signals to the individual circulators that control the direction of circulation for each circulator. For example, the circulator switch controller 110 sends a high current pulse to a particular circulator that changes the direction of circulation in that circulator. In certain implementations, the circulator switch controller 110 includes a separate driver that is associated with each circulator in the system 100, where the driver provides a switching signal to an individual circulator. In at least one other implementation, where switching time is not critical, the circulator switch controller 110 may include a single driver that is multiplexed to the separate circulators in the circulator module 106. In a further embodiment, the circulator switch controller includes an interface that allows a user to control the switching directly through another device.

The circulator modules 106 include multiple ferrite elements that typically have impedance-matching transitions between each ferrite element. For example, a conventional waveguide circulator may transition from one ferrite element to a dielectric-filled waveguide such as a quarter-wave dielectric transformer structure, to an air-filled waveguide, and then back to another dielectric-filled waveguide section and the next ferrite element. The dielectric transformers are typically used to match the lower impedance of the ferrite element to that of an air-filled waveguide.

As stated above, a circulator module 106 may contain multiple waveguide circulators. Further, the circulator module 106 may also include multiple load elements for isolation of certain ports in some of the ferrite circulators, where the multiple load elements are designed to match the impedance of an air-filled waveguide interface. The circulators and load elements can be connected in various configurations according to the modular design of the circulator module 106. In certain implementations, the system 100 is comprised of modular components that allow the system 100 to include at least three standby components. For example, a system 100, having N amplifiers 108 where M amplifiers 108 are operational at any given time, provides switching so that N−M standby amplifiers 108 can be switched into the communication paths in system 100 such that there are always M communication paths available between the transmitter/receiver 104 and the antenna 102. As described herein, N−M≥3 as provided by the circulator modules described hereafter.

Figure 2A:
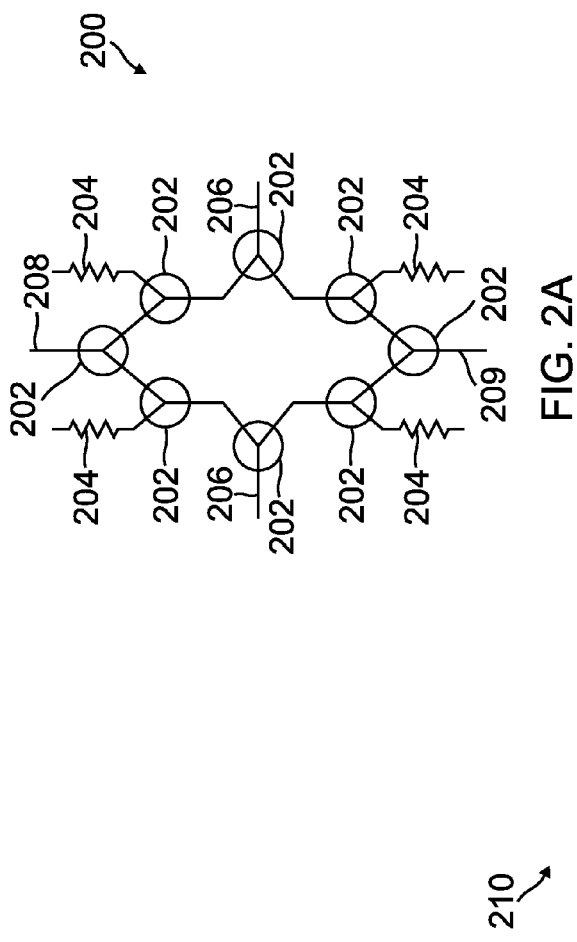
FIGS. 2A and 2B are schematic illustrations of switch network configuration in one embodiment described in the present disclosure.
Figure 2B:
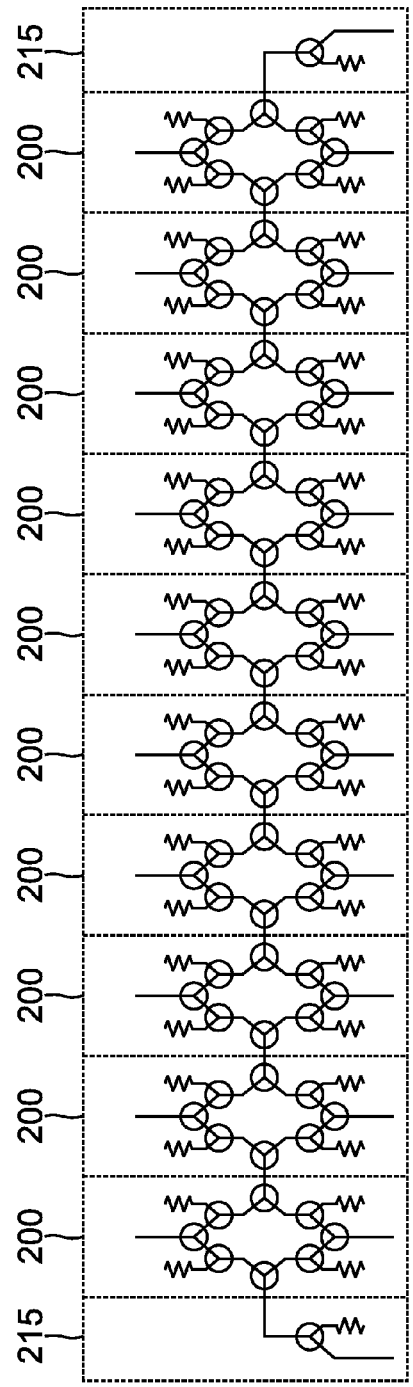

FIG. 2A illustrates one embodiment of a circulator module 200 and FIG. 2B illustrates another embodiment of a redundancy network 210, where the redundancy network 210 is formed by combining the circulator module 200 to other circulator modules 200. The circulator module 200 is configured for N−M=2 redundancy and the waveguides in the circulator module 200 do not cross over. Also, circulator module 200 includes multiple circulators 202 and multiple matched loads 204 that terminate sections of waveguides to isolate signals that may propagate in an undesired direction. FIG. 2B illustrates an N−M=2 redundancy network 210 that includes circulator modules 200 and modified circulator modules 215. A modified circulator module 215 is formed by removing module output 208 from a circulator module 200 and removing circuitry that becomes superfluous with the removal of module output 208. As shown in FIG. 2B, modified circulator module 215 is an exemplary implementation of a modified circulator module. Other configurations may be used, where some of the configurations include superfluous circulators and other components. Any open waveguide sections that are formed by the removal of circuitry may be terminated with a matched load 204. As shown, in the redundancy network 210, a signal that is received through a module input of the modified circulator module 215 is circulated into the neighboring circulator module 200. Conversely, any signal that is circulated into the modified circulator module 215 from a neighboring circulator module 200 is circulated into a matched load 204. As illustrated, circulator module 200 is only an example of a circulator module that can be formed that lacks crossing waveguides. Other circulator modules that lack crossing waveguides may be designed that can be formed into N−M=2 redundancy networks. Also, multiple other circulator modules may be formed that can be formed into different redundancy networks. For example, multiple circulator modules are described in the U.S. patent application Ser. No. 13/923,497 (the '497 application) titled "MODULAR FERRITE SWITCH FOR CONSTRUCTING SWITCH NETWORKS," filed on Jun. 21, 2013, and which is herein incorporated by reference.

Figure 3:
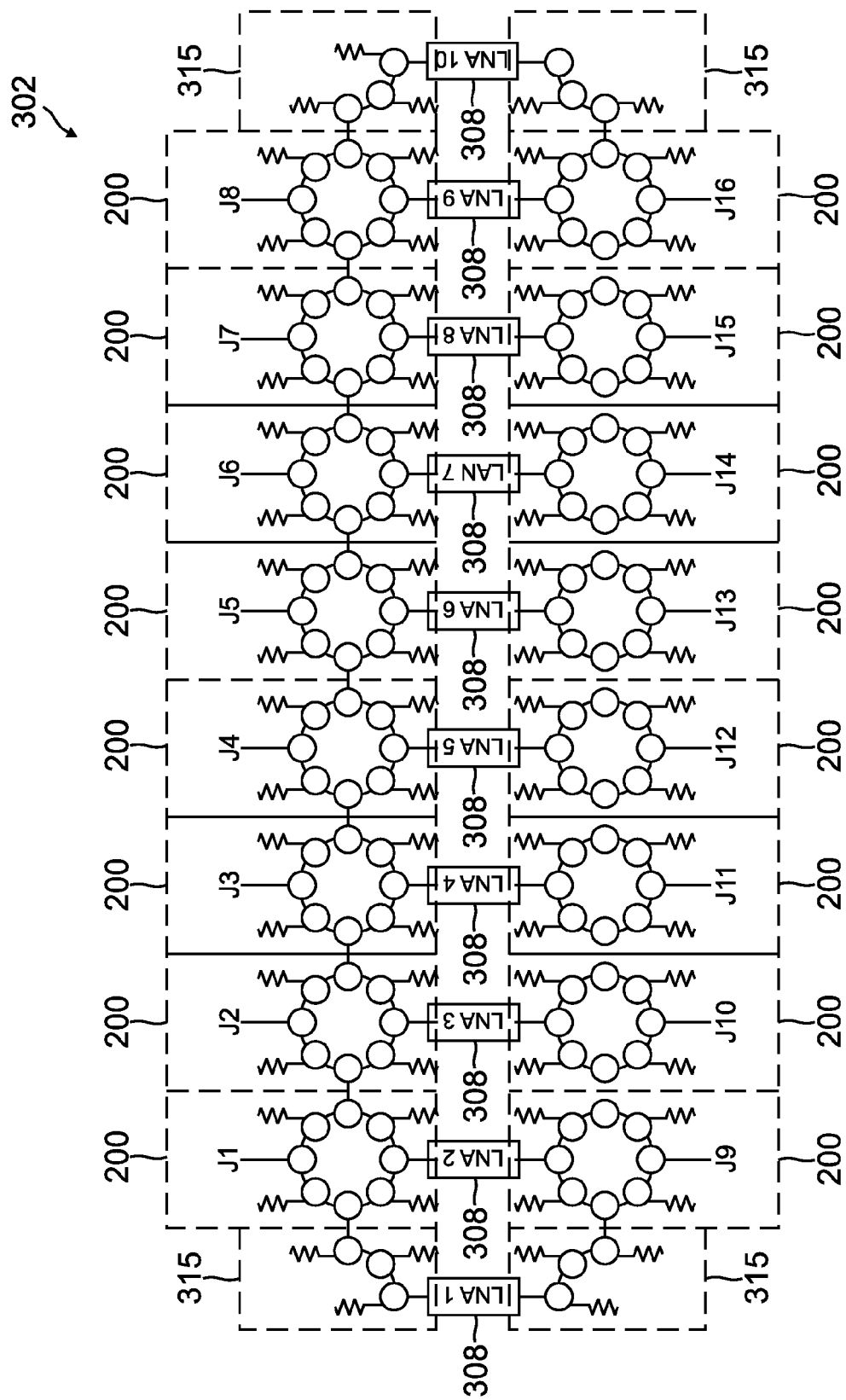
FIG. 3 is a schematic illustration of a switch network configuration in one embodiment described in the present disclosure.

FIG. 3 is a schematic illustration of a switching network 302 that provides N−M=2 redundancy and comprises the circulator modules 200 described in FIGS. 2A and 2B. In particular, FIG. 3 illustrates a switching network 302 having 10 for 8 implementation. As used here in the phrase "10 for 8" can be represented generally as "N for M". As described above, the N indicates how many amplifiers 308 are provided in the system and the M indicates how many communication paths are available through the switching network 302. Also, the M indicates how many amplifiers 308 are operational at a time. Thus, the switching network 302 having 10 for 8 redundancy indicates that the switching network 302 includes ten amplifiers 308 where only eight amplifiers 308 are operational at a given time. In a similar manner as illustrated in FIG. 2B, switching network 302 also includes modified circulator modules 315, which function similarly to modified circulator module 215 described above. The switching network 302 is substantially described in the '497 application. While the switching network 302 is able to provide N−M=2 redundancy, the switching network 302 fails to provide any greater levels of redundancy. Also, upon experiencing a failure of a single amplifier 308, the switching network 302 potentially alters up to three different communication paths through the switching network 302. For example if either of LNA 5 or LNA 6 fails, then three other communication paths through the switching network 302 will also change.

Figure 4:
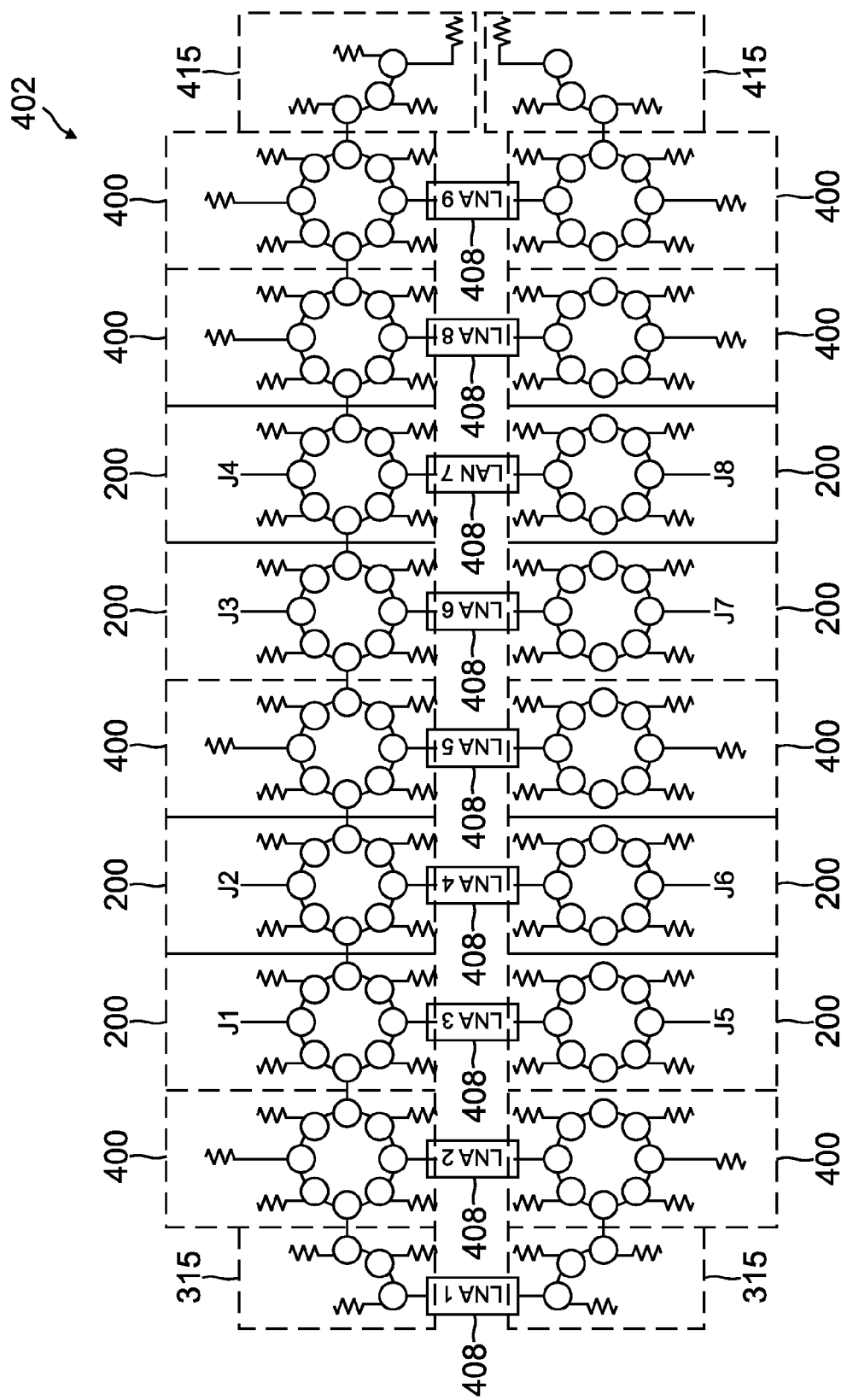
FIG. 4 is a schematic illustration of a switch network configuration in one embodiment described in the present disclosure.

FIG. 4 is a schematic illustration of a switching network 402 that provides N−M=3 redundancy where only the communication path interrupted by a failed amplifier 408 is altered upon the first failure experienced in switching network 402. As shown switching network 402 has 9 for 4 redundancy and contains three different circulator modules. Two of the circulator modules (circulator modules 200 and 315) are described above in relation to FIGS. 2A, 2B, and 3. However, switching network 402 also includes circulator module 400, which is similar to circuit module 200 with the exception of having a terminating load attached to the input port. As such, switching network 402 is an altered version of switching network 302. In particular, every third circulator module 200 of FIG. 3 has been replaced by a circulator module 400 having the terminated input port. Also, the first and last input ports may be terminated with loads, which is why an 8 input switching network, such as switching network 302, is able to be reconfigured for 4 inputs as compared to 5. As shown, the same pattern of circulator modules may be repeated on the output side of the switching network 402. In an alternative implementation, as compared to terminating the circulator modules 400 with a load, the circulator modules 400 may also be terminated with a short circuit. Further, to enable the N−M=3 redundancy, two amplifiers 408 may be located in the paths adjacent to the first input (denoted by a J1) and a last input (denoted by J4). For example, LNA 1 and LNA 2 may be located adjacent to the first input J1. Also, LNA 8 and LNA 9 may be located adjacent to the last input J4. As two amplifiers 408 may be located in the paths adjacent to the first input J1 and the last input J4, a 10th LNA (as used in switching network 302) becomes unnecessary and may be removed from the reconfigured switching network 402. In certain implementations, the LNA 10 of switching network 302 may be replaced with terminations such as loads on the 2 connecting ports of one of the modified circulator modules 415.

FIGS. 5A-5C illustrate different communication paths through the switching network 402 of FIG. 4, when the switching network 402 has experienced up to 2 failures. For example, FIG. 5A illustrates the communication paths from the inputs J2 and J3 when the switching network 402 has yet to experience a failure along one of the communication paths and can also be said to be a starting configuration. In a starting configuration, all LNAs 408 located directly in the path of the inputs would be turned on, the signal through input J2 would go through LNA 4 along communication path 510a and the signal through input J3 would go through LNA 6 along communication path 512b.

FIG. 5B illustrates one example of the rerouting of communication paths when the switching network 402 experiences a failure. As illustrated, LNA 4 along communication path 510a experiences a failure. In the case of a first LNA 408 failure, the input with the failed LNA may be switched to the adjacent path having a standby LNA. As shown, the adjacent path having a standby LNA would be the path to the left for J1 and J3 or the path to the right for J2 and J4 as shown in switching network 402 in FIG. 4. Because each input port has an adjacent path to one side that does not have an input port connection, any first failed LNA can be switched out of the path to a standby (redundant) LNA without disrupting other active paths, which disruptions would force the other active paths to also switch to an adjacent LNA. As shown, FIG. 5B shows this change of communication paths from inputs J2 and J3 following a failure on LNA 4, where the communication path 510b is changed such that J2 is connected to LNA 5. Communication path 512b remains substantially the same as communication path 512a. Thus, in regards to the switching network 402 of FIG. 4, the inputs are connected to the LNAs as follows: J1-LNA 3, J2-LNA 5, J3-LNA 6, and J4-LNA 7.

FIG. 5C illustrates one exemplary implementation for the rerouting of a communication path if a second LNA were to fail following the failure of LNA 4 described above with respect to FIG. 5B. When two LNAs 408 fail, there are multiple reconfiguration variations. For example, If LNA 3 or LNA 7, in switching network 402, fails, then the associated signals could be respectively rerouted through LNA 2 or LNA 8 without disrupting other active channels. If LNA 6 were to fail, then the failed path from input J3 would change to pass through LNA 7, and this would force the path from input J4 path to also change and pass through LNA 8. When other paths are forced to change, it may be considered a disruption to the active paths from other inputs. As illustrated in FIG. 5C, LNA 5 is the second LNA 408 to fail after LNA 4. The failure of LNA 5 is the second failure along a path from input J2 as path 510a was reconfigured to create path 510b through LNA 5. To reroute the communication path 510b, the input from J2 is rerouted to form communication path 510c, which passes through LNA3. Accordingly, the input from J1 is rerouted along communication path 514c, which connects to LNA 2. As such, after the failures of LNA 4 and LNA 5, the connectivity in switching network 402 may be J1-LNA 2, J2-LNA 3, J3-LNA 6, and J4-LNA 7.

Figure 6A:
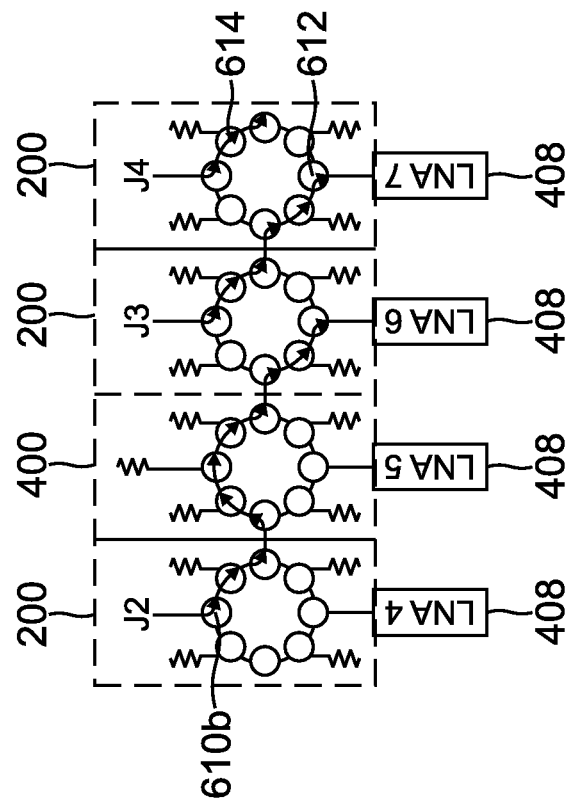
FIGS. 6A-6B are schematic illustrations of the routing of signals through a switch network configuration when more than two low noise amplifiers experience failures in one embodiment described in the present disclosure.
Figure 6B:
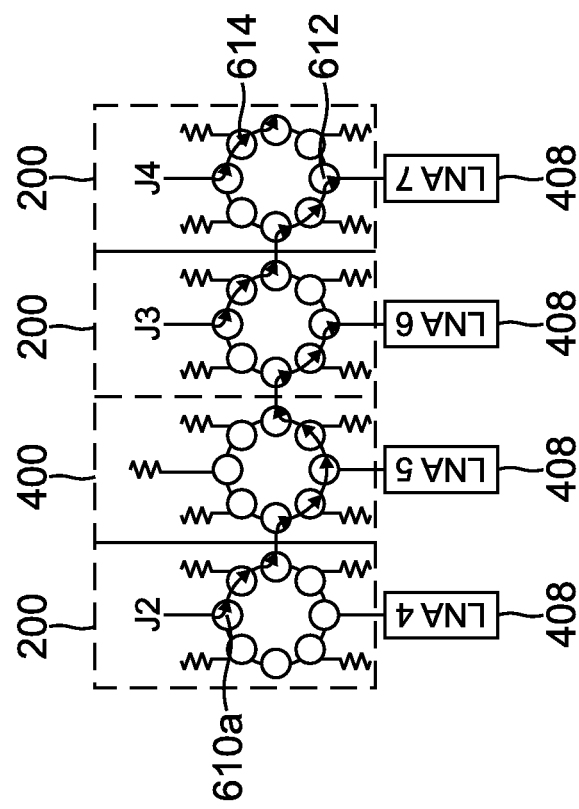

FIGS. 6A and 6B illustrate different alternatives if a third LNA 408 were to fail following the failure of LNA 4 and LNA 5. If a third LNA were to fail following the LNA 4 and LNA 5 failures, then there may be multiple reconfiguration variations, some of which may be similar to the reconfigurations described above. In one scenario, the LNA 408 fails that receives a signal from the input J2. For example, LNA 3 fails after the failure of LNA 4 and LNA 5. As the failure of LNA 3 would be the third failure on the communication path from input J2, the LNA to the left (LNA 3), right (LNA 5), and directly in line with input J2 (LNA 4) have failed. To reconfigure the path 510c from input J2, a reconfigured path 610a in FIG. 6A or path 610b in FIG. 6B routs a signal from input J2 past 2 failed LNAs to connect to LNA 6. As with the first failure of LNA 4, the direction of paths 610a and 610b may be in the direction of the loaded input port, or to the right, towards LNA 6 for the example involving input J2. To reconfigure according to path 610a, the signal is routed through the bottom 5 ferrite switches in the circulator module 400 to the right of the circulator module 200 that contains input J2, as shown in FIG. 6A. Alternatively, to reconfigure according to path 610b, the signal is routed through the top 5 ferrite switches in the circulator module 400 to the right of the circulator module 200 that contains input J2, as shown in FIG. 6B. Paths 612 and 614 that are respectively connected to input J3 and input J4 are also shifted to the right to allow the path from input J2 to connect to LNA 6. After the reconfiguration, the connectivity in switching network 402 may be J1-LNA 2, J2-LNA 6, J3-LNA 7, J4-LNA 8. Further, if LNA 6 were to fail, for a 4th failure in the J2 path connection, then J2 would be unable to switch to a 5th LNA. However, if LNA 2 or LNA 8 were to fail for a 4th or 5th LNA 608 failure, then LNA 1 or LNA 9 could be switched in, respectively. Thus, the switching network 402 of FIG. 4 is able to accommodate up to 3 LNA failures and 4 or 5 LNA failures in specific cases. As has been shown through, FIGS. 5A-6B illustrate the changing of paths through input circulator modules having inputs J1-J4. As illustrated in FIG. 3, there are corresponding output circulator modules having outputs J5-J8. As the LNAs 408 in the switching network 402 fail, the paths through the output circulator modules are altered in a similar manner to the input circulator modules. In one implementation, the paths through the output circulator modules are altered to mirror the paths through the input circulator modules.

Figure 7:
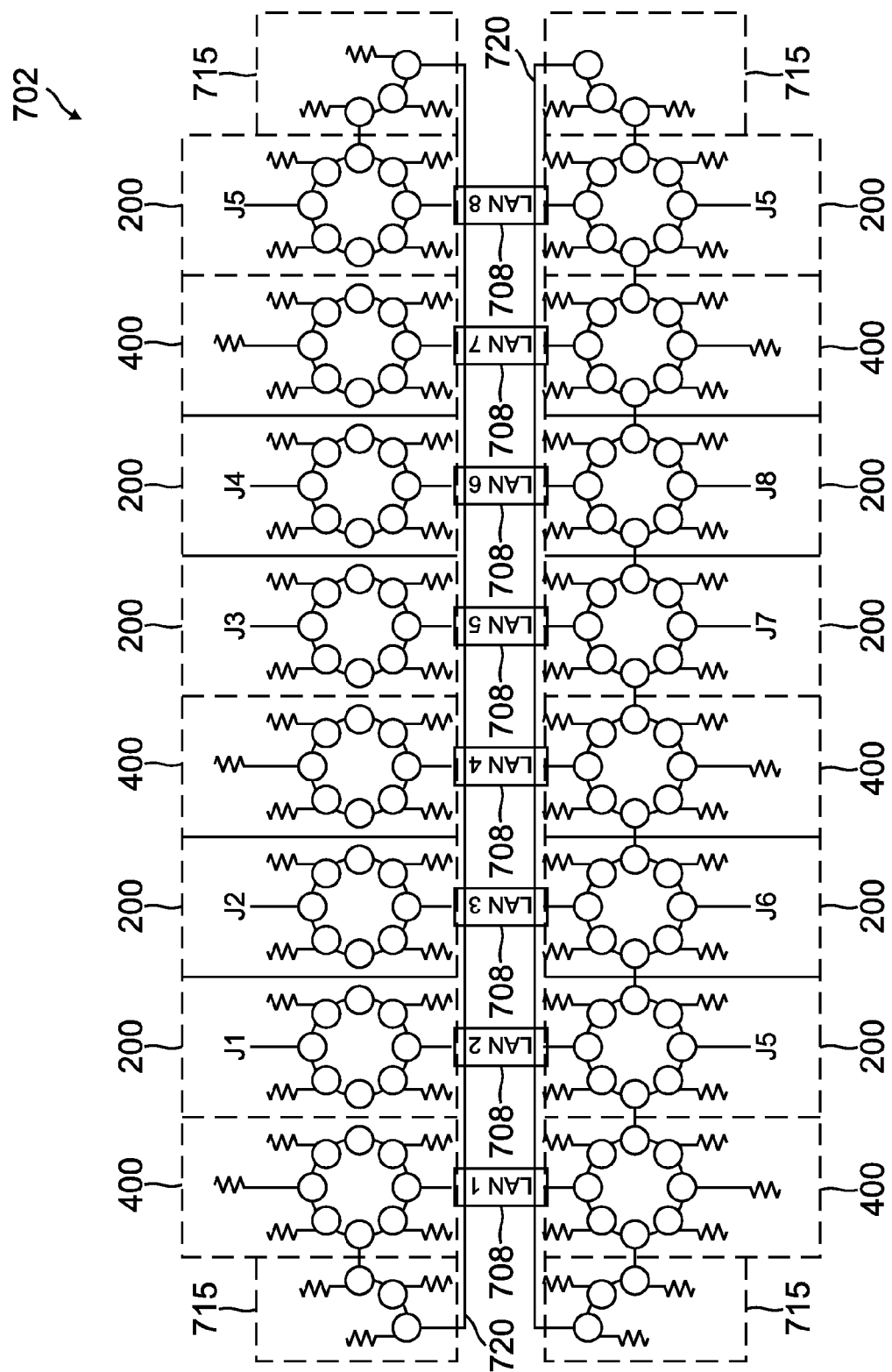
FIG. 7 is a schematic illustration of a switch network configuration including a waveguide run in one embodiment described in the present disclosure.

In further implementations, other modifications to the switching network 302 of FIG. 3 may also be made. Other modifications may have an increased efficiency, however, other modifications also are accompanied by other tradeoffs. FIG. 7 provides an illustration of a switching network 702 that permits an additional input, when compared to the switching network 402. Further, the switching network 702 uses one less LNA 708 and is an 8-for-5 redundancy scheme. However, the switching network 702 includes a waveguide 720 that connects opposite sides of the switching network 702. For example, in the locations where the switching network 302 would contain LNA 1 and LNA 10, switching network 702 includes a waveguide 720 that connects the modified circulator modules 715 to one another. The inclusion of a waveguide adds complexity as well as insertion loss, which degrades the noise figure of the path in the case where RF must be switched from one side to the other through the long waveguide run.

Figure 8:
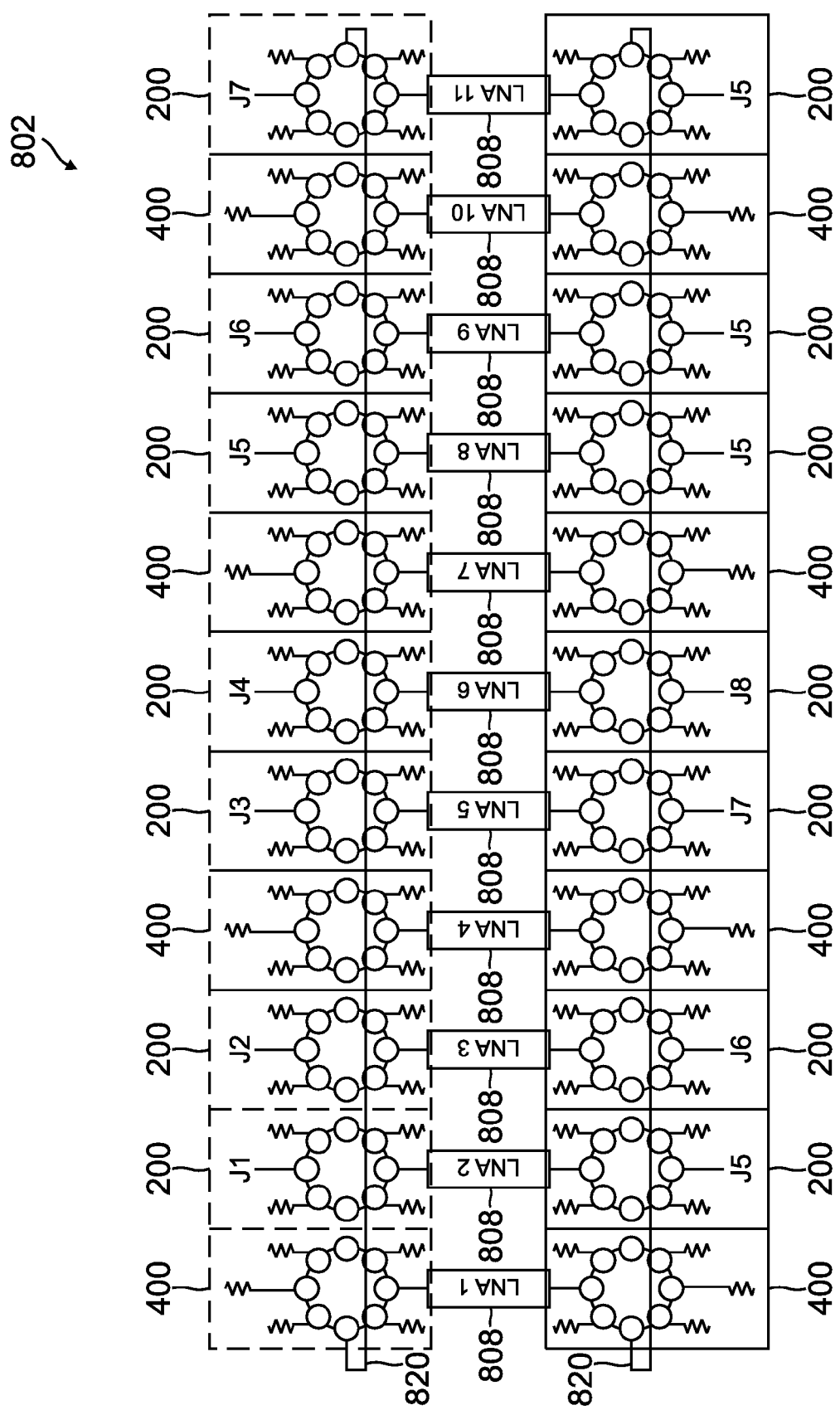
FIG. 8 is a schematic illustration of a switch network configuration including a waveguide run in one embodiment described in the present disclosure.

Certain implementations may use up to 7 channels through a switching network. In one implementation, to provide 7 channels through a switching network, two of switching network 402 or two of switching network 702 may be combined. FIG. 8 illustrates a switching network 802 that comprises a modified version of switching network 702, where additional modules have been added to increase the number of operating channels from 5 to 7. As shown, the switching network 802 is an 11 for 7 switching network. Similar to switching network 702, the switching network 802 includes a waveguide 820 that extends from the circulator modules on the ends of the switching network 802, which switching network 802 includes a circulator module 400 on one end and a circulator module 200 on the other end, where the two circulator modules are connected by a waveguide 820.

Figure 9:
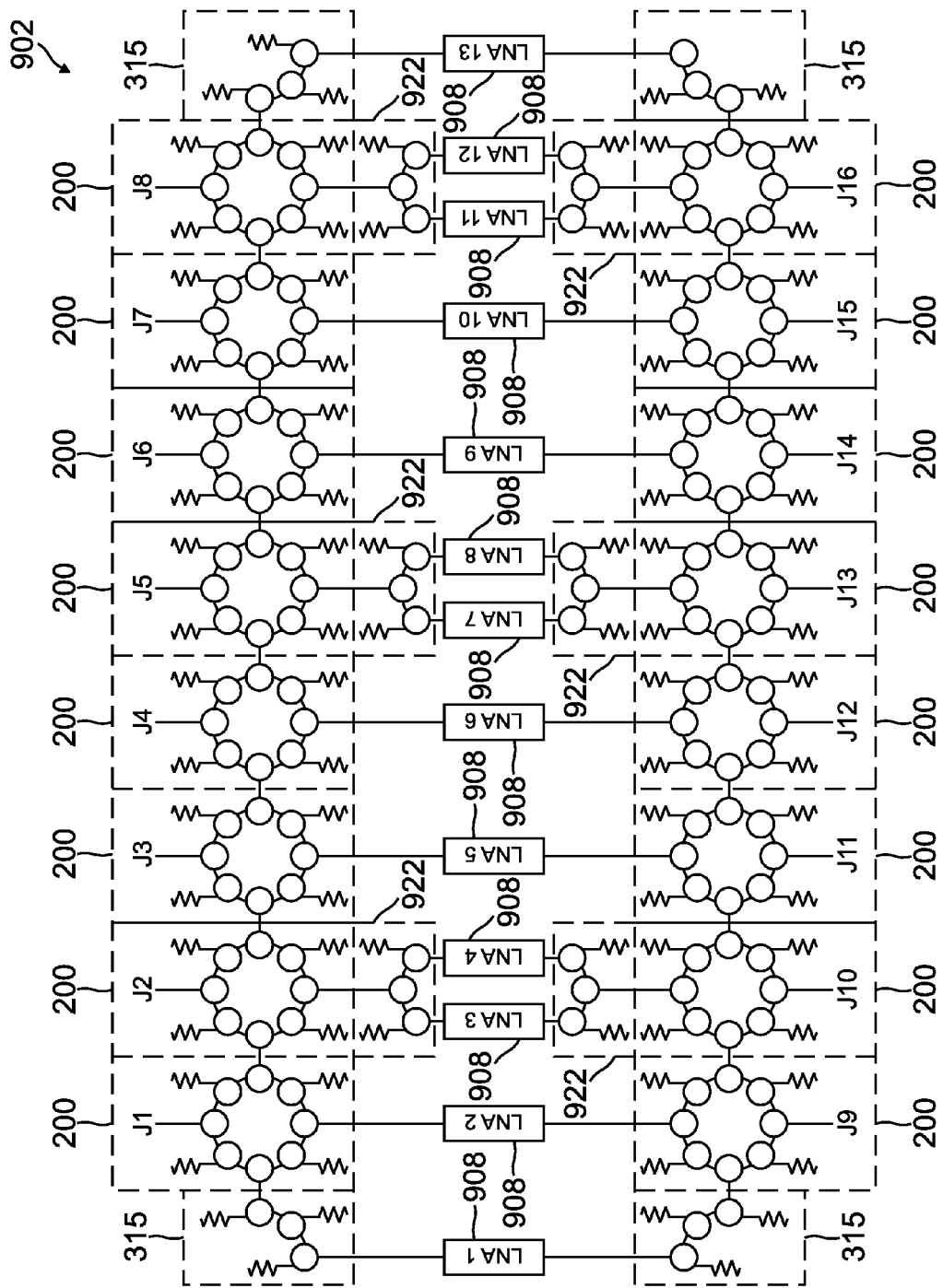
FIG. 9 is a schematic illustration of a switch network configuration that includes two for one redundant triads in one embodiment described in the present disclosure.

As described above, in the case where three failures occur to the same path, the affected path then passes through 11 different ferrite switches as shown in FIGS. 6A and 6B. Each additional ferrite switch that a signal passes through negatively affects the noise figure of the signal. To decrease the noise figure, a 2 for 1 redundant triad switch may be added to every third path. A 2 for 1 redundant triad switch is described in greater detail in U.S. Pat. No. 6,885,257, titled "Multi junction waveguide circulator without internal transitions", which is incorporated herein by reference. The addition of a 2 for 1 redundant triad serves a similar function to skipping every third input as described in the implementation of FIG. 4, however, in contrast to switching network 402, all the inputs may be used. As shown in FIG. 9, each path through a circulator module 200 can be switched straight through or to one switch ring 200 to the left or right, and one of these 3 positions includes an extra standby LNA 908 as a result of the 2 for 1 redundant triad switches 922.

Figure 10:
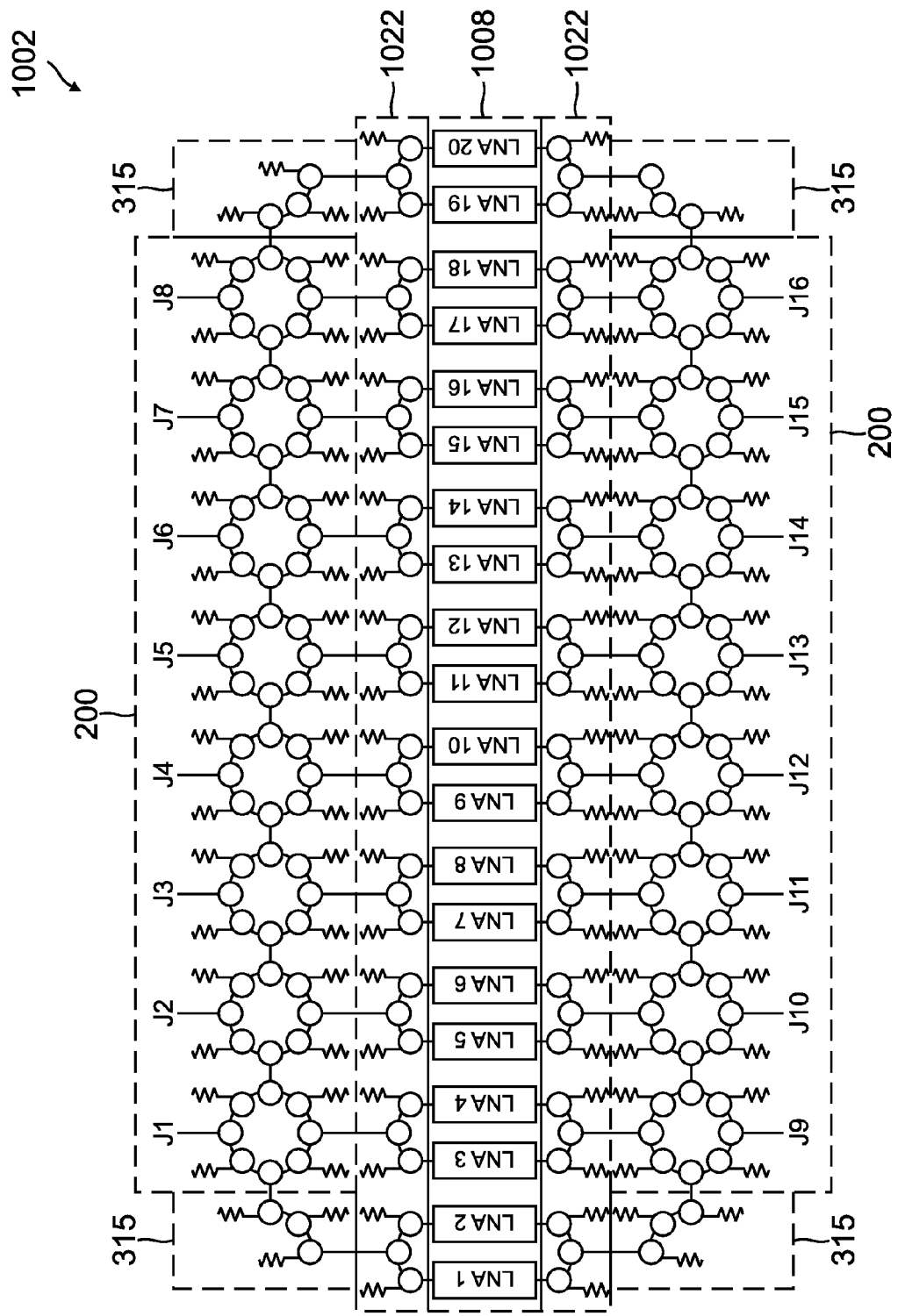
FIG. 10 is a schematic illustration of a switch network configuration that includes two for one redundant triads in one embodiment described in the present disclosure.

This allows each input of the switching network 902 to connect to four LNAs 908, which allows full connectivity after three LNA failures. However, unless the first LNA failure is one of the LNA's connected to a 2-for-1 triad switch 922, a failure would result in disruption not only to the failed path but also to a neighboring path. If the connection between input J2 and LNA 3 fails, then LNA 4 can be switched in without disrupting other paths. This is not the case if LNA 5 is the first failure, which would require a number of the paths to move over 1 LNA position to the left or right. Further, as illustrated by FIG. 10, a switching network 1002 places the 2-for-1 redundant triad switches 1022 in all 10 locations of the original 10-for-8 switching network 302 to assure that the first failed LNA 1008 does not require the other 7 paths through the circulator modules 200 to be disrupted. If LNA 3 were to fail, then LNA 4 could be switched in. The switching network 1002 also may be able to accommodate up to 4 LNA failures, whereas the other examples of FIGS. 4-9 are able to accommodate up to 3 LNA failures. However, switching network 1002 requires the most standby LNAs 1008, as switching network 1002 is a 20 for 8 switching network.

Figure 11:
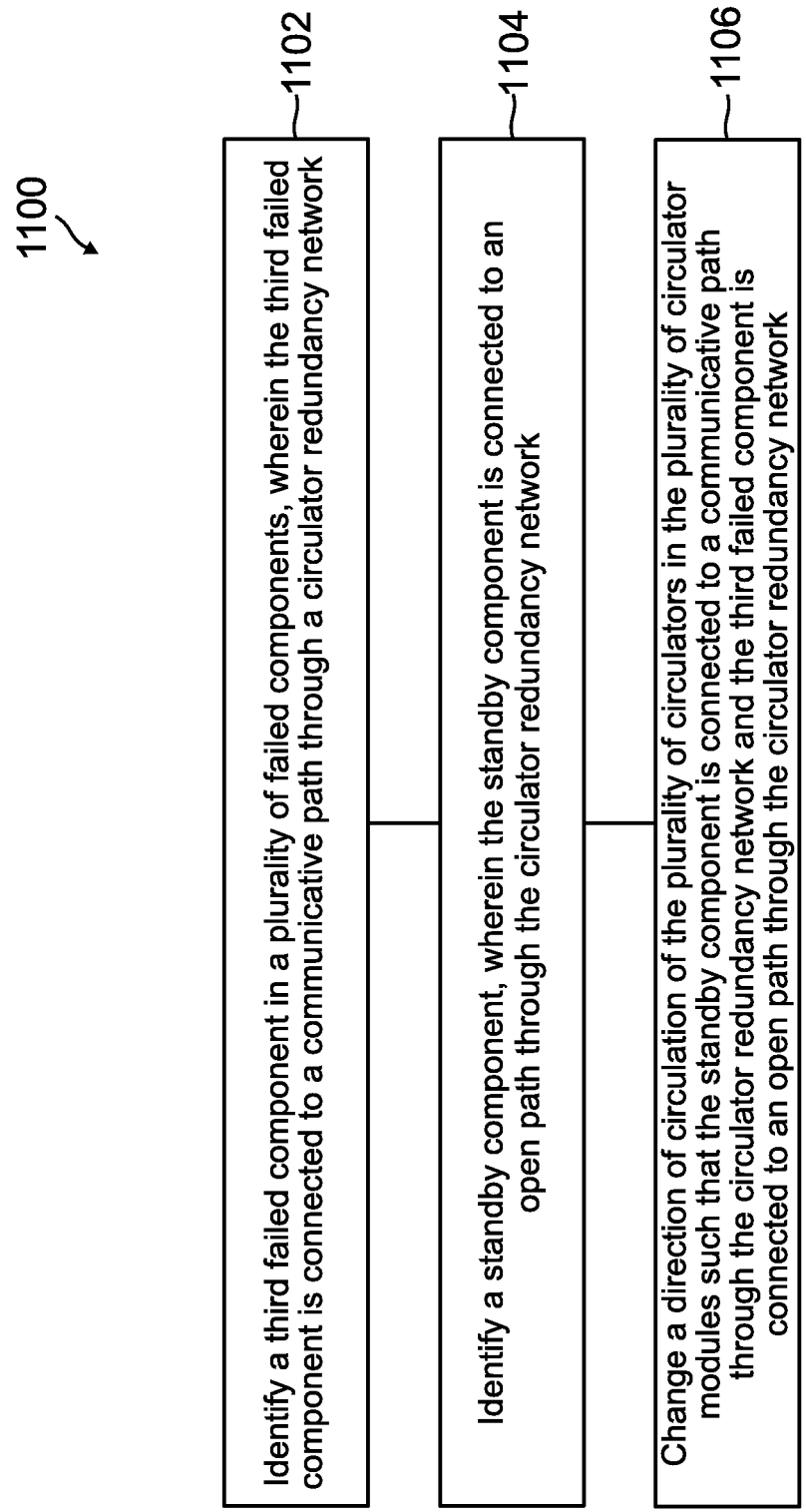
FIG. 11 is a flow diagram of a method for routing signals through a circulator redundancy network in one embodiment described in the present disclosure.

FIG. 11 is a flow diagram of a method 1100 for routing signals through a circulator redundancy network when a third component fails. For example, method 1100 proceeds at 1102, where a third failed component in a plurality of failed components is identified, wherein the third failed component is connected to a communicative path through a circulator redundancy network. Method 1100 then proceeds at 1104, where a standby component is identified, wherein the standby component is connected to an open path through the circulator redundancy network. Further, method 1100 proceeds at 1106, where a direction of circulation of the plurality of circulators in the plurality of circulator modules is changed such that the standby component is connected to a communicative path through the circulator redundancy network and the third failed component is connected to an open path through the circulator redundancy network.

Example Embodiments

Example 1 includes a redundant ferrite switch system, the system comprising: a first plurality of circulator modules, wherein the first plurality of circulator modules comprises: a first plurality of first inputs; a first plurality of first outputs; and a first plurality of circulators configured to connect the first plurality of first inputs to the first plurality of first outputs; a second plurality of circulator modules, wherein the second plurality of circulator modules comprises: a second plurality of second inputs; a second plurality of second outputs; and a second plurality of circulators configured to connect the second plurality of second inputs to the second plurality of second outputs; and a plurality of components coupled to the first plurality of circulator modules and coupled to the second plurality of circulator modules, wherein the first plurality of circulator modules and the second plurality of circulator modules is able to route a path through the redundant ferrite switch system when more than two components in the plurality of components have failed.

Example 2 includes the system of Example 1, wherein each third input of the first plurality of first inputs is terminated with a load and wherein each third output of the second plurality of second outputs is terminated with a load.

Example 3 includes the system of any of Examples 1-2, wherein the first plurality of circulator modules comprises at least six circulator modules.

Example 4 includes the system of any of Examples 1-3, wherein the second plurality of circulator modules comprises at least six circulator modules.

Example 5 includes the system of any of Examples 1-4, wherein each module of the first plurality of circulator modules comprises at least three circulators; and wherein each module of the second plurality of circulator modules comprises at least three circulators.

Example 6 includes the system of any of Examples 1-5, wherein each third circulator module in the first plurality of circulator modules is coupled to a 2-for-1 redundant triad switch, wherein each third circulator module in the second plurality of circulator modules is coupled to a 2-for-1 redundant triad switch, and wherein each of the 2-for-1 redundant triad switches is coupled to two components of the plurality of components.

Example 7 includes the system of any of Examples 1-6, wherein each circulator module in the first plurality of circulator modules is coupled to a 2-for-1 redundant triad switch, wherein each circulator module in the second plurality of circulator modules is coupled to a 2-for-1 redundant triad switch and wherein each of the 2-for-1 redundant triad switches is coupled to two components of the plurality of components.

Example 8 includes the system of any of Examples 1-7, further comprising: a first waveguide connecting a first end of the first plurality of circulator modules to a second end of the first plurality of circulator modules, wherein the first end is located opposite the second end in the first plurality of circulator modules; and a second waveguide connecting a first end of the second plurality of circulator modules to a second end of the second plurality of circulator modules, wherein the first end is located opposite the second end in the second plurality of circulator modules.

Example 9 includes the system of any of Examples 1-8, wherein if a first component in the plurality of components fails, the first plurality of circulator modules and the second plurality of circulator modules is able to route a path through a redundant component in the plurality of components without disrupting an active communication path in the redundant ferrite switch system other than the path that was active prior to when the first component failed.

Example 10 includes a plurality of circulator modules for use in a redundant ferrite switch system comprising: a plurality of inputs; a plurality of outputs; a plurality of circulators coupling the plurality of inputs to the plurality of outputs; wherein either the plurality of inputs or the plurality of outputs is coupled to a plurality of components; and wherein the plurality of circulator modules is able to route a path through the redundant ferrite switch system when more than two components in the plurality of components have failed.

Example 11 includes the plurality of circulator modules of Example 10, wherein either at least three of the plurality of inputs are terminated with loads or at least three of the plurality of outputs are terminated with loads or both.

Example 12 includes the plurality of circulator modules of any of Examples 10-11, wherein each third input of the plurality of inputs is terminated with a load and wherein each third output of the plurality of outputs is terminated with a load.

Example 13 includes the plurality of circulator modules of any of Examples 10-12, wherein the plurality of circulator modules comprises at least six circulator modules.

Example 14 includes the plurality of circulator modules of any of Examples 10-13, wherein each module of the plurality of circulator modules comprises at least three circulators.

Example 15 includes the plurality of circulator modules of any of Examples 10-14, wherein each third circulator module in the plurality of circulator modules includes a 2-for-1 redundant triad switch and wherein each of the 2-for-1 redundant triad switches is coupled to two components in the plurality of components.

Example 16 includes the plurality of circulator modules of any of Examples 10-15, wherein every circulator module in the plurality of circulator modules includes a 2-for-1 redundant triad switch and wherein each of the 2-for-1 redundant triad switches is coupled to two components in the plurality of components.

Example 17 includes the plurality of circulator modules of any of Examples 10-16, further comprising a waveguide connecting a first end of the plurality of circulator modules to a second end of the plurality of circulator modules, wherein the first end is located opposite the second end in the plurality of circulator modules.

Example 18 includes the plurality of circulator modules of any of Examples 10-17, wherein if a first component in the plurality of components fails, the plurality of circulator modules is able to route a path through a redundant component in the plurality of components without disrupting an active communication path in the plurality of circulator modules other than the path that was active prior to when the first component failed.

Example 19 includes a method for switching communication paths in a circulator redundancy network, the method comprising: identifying a failed component in a plurality of failed components, wherein the failed component is connected to a communicative path through the circulator redundancy network and the plurality of failed components comprises at least two previously failed components, the circulator redundancy network comprising a plurality of circulator modules, wherein a circulator module comprises: a plurality of circulators that are configurable to route received signals through the circulator redundancy network along a plurality of communication paths by connecting with other circulator modules in the plurality of circulator modules and by connecting with a plurality of components; identifying a standby component in the plurality of components, wherein the standby component is connected to an open path through the circulator redundancy network and the at least two previously failed components are connected to open paths through the circulator redundancy network; and changing a direction of circulation of one or more of the plurality of circulators in the plurality of circulator modules such that the standby component is connected to a communicative path through the circulator redundancy network, and the failed component is connected to an open path through the circulator redundancy network.

Example 20 includes the method of Example 19, further comprising changing a direction of circulation of one or more of the plurality of circulators in the plurality of circulator modules such that an active communication path is not disrupted in the circulator redundancy network when a first failed component in the plurality of failed components fails.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A redundant ferrite switch system, the system comprising:
   a first plurality of circulator modules, wherein the first plurality of circulator modules comprises:
      a first plurality of first inputs;
      a first plurality of first outputs; and
      a first plurality of circulators configured to connect the first plurality of first inputs to the first plurality of first outputs;
   a second plurality of circulator modules, wherein the second plurality of circulator modules comprises:
      a second plurality of second inputs;
      a second plurality of second outputs; and
      a second plurality of circulators configured to connect the second plurality of second inputs to the second plurality of second outputs;
   a plurality of components coupled to the first plurality of circulator modules and coupled to the second plurality of circulator modules, wherein each circulator module in the first plurality of circulator modules and each circulator module in the second plurality of circulator modules is coupled to a respective component in the plurality of components wherein the first plurality of circulator modules and the second plurality of circulator modules is able to route a path through the redundant ferrite switch system when more than two components in the plurality of components have failed: and
   wherein each module of the first plurality of circulator modules comprises at least three circulators; and
   wherein each module of the second plurality of circulator modules comprises at least three circulators.

2. The system of claim 1, wherein each third input of the first plurality of first inputs is terminated with a load and wherein each third output of the second plurality of second outputs is terminated with a load.

3. The system of claim 1, wherein the first plurality of circulator modules comprises at least six circulator modules.

4. The system of claim 1, wherein the second plurality of circulator modules comprises at least six circulator modules.

5. The system of claim 1, wherein each third circulator module in the first plurality of circulator modules is coupled to a 2-for-1 redundant triad switch, wherein each third circulator module in the second plurality of circulator modules is coupled to a 2-for-1 redundant triad switch, and wherein each of the 2-for-1 redundant triad switches is coupled to two components of the plurality of components.

6. The system of claim 1, wherein each circulator module in the first plurality of circulator modules is coupled to a 2-for-1 redundant triad switch, wherein each circulator module in the second plurality of circulator modules is coupled to a 2-for-1 redundant triad switch and wherein each of the 2-for-1 redundant triad switches is coupled to two components of the plurality of components.

7. The system of claim 1, further comprising:
   a first waveguide connecting a first end of the first plurality of circulator modules to a second end of the first plurality of circulator modules, wherein the first end is located opposite the second end in the first plurality of circulator modules; and
   a second waveguide connecting a first end of the second plurality of circulator modules to a second end of the second plurality of circulator modules, wherein the first end is located opposite the second end in the second plurality of circulator modules.

8. The system of claim 1, wherein if a first component in the plurality of components fails, the first plurality of circulator modules and the second plurality of circulator modules is able to route a path through a redundant component in the plurality of components without disrupting an active communication path in the redundant ferrite switch system other than the path that was active prior to when the first component failed.

9. A plurality of circulator modules for use in a redundant ferrite switch system comprising:
   a plurality of inputs;
   a plurality of outputs;
   a plurality of circulators coupling the plurality of inputs to the plurality of outputs;
   wherein either the plurality of inputs or the plurality of outputs is coupled to a plurality of components, wherein each circulator module in the plurality of circulator modules is coupled through one of the plurality of inputs and the plurality of outputs to a respective component in the plurality of components;
   wherein the plurality of circulator modules is able to route a path through the redundant ferrite switch system when more than two components in the plurality of components have failed; and
   wherein each module of the plurality of circulator modules comprises at least three circulators.

10. The plurality of circulator modules of claim 9, wherein either at least three of the plurality of inputs are terminated with loads or at least three of the plurality of outputs are terminated with loads or both.

11. The plurality of circulator modules of claim 9, wherein each third input of the plurality of inputs is terminated with a load and wherein each third output of the plurality of outputs is terminated with a load.

12. The plurality of circulator modules of claim 9, wherein the plurality of circulator modules comprises at least six circulator modules.

13. The plurality of circulator modules of claim 9, wherein each third circulator module in the plurality of circulator modules includes a 2-for-1 redundant triad switch and wherein each of the 2-for-1 redundant triad switches is coupled to two components in the plurality of components.

14. The plurality of circulator modules of claim 9, wherein every circulator module in the plurality of circulator modules includes a 2-for-1 redundant triad switch and wherein each of the 2-for-1 redundant triad switches is coupled to two components in the plurality of components.

15. The plurality of circulator modules of claim 9, further comprising a waveguide connecting a first end of the plurality of circulator modules to a second end of the plurality of circulator modules, wherein the first end is located opposite the second end in the plurality of circulator modules.

16. The plurality of circulator modules of claim 9, wherein if a first component in the plurality of components fails, the plurality of circulator modules is able to route a path through a redundant component in the plurality of components without disrupting an active communication path in the plurality of circulator modules other than the path that was active prior to when the first component failed.

* * * * *